(12) United States Patent
Huang et al.

(10) Patent No.: US 12,511,277 B2
(45) Date of Patent: Dec. 30, 2025

(54) SYSTEM AND METHOD FOR MULTIVARIATE ANOMALY DETECTION

(71) Applicant: ROYAL BANK OF CANADA, Toronto (CA)

(72) Inventors: Vincent Chiu-Hua Huang, Toronto (CA); Jingyi Gao, Toronto (CA); Jinda Yang, Toronto (CA); Kanika Vij, Toronto (CA); William Kurelek, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/136,924

(22) Filed: Dec. 29, 2020

(65) Prior Publication Data

US 2021/0200746 A1   Jul. 1, 2021

Related U.S. Application Data

(60) Provisional application No. 63/081,494, filed on Sep. 22, 2020, provisional application No. 62/955,007, filed on Dec. 30, 2019.

(51) Int. Cl.
*G06F 16/23* (2019.01)
(52) U.S. Cl.
CPC ................ *G06F 16/2365* (2019.01)
(58) Field of Classification Search
None
See application file for complete search history.

(56) References Cited

U.S. PATENT DOCUMENTS

| | | | | |
|---|---|---|---|---|
| 6,563,952 | B1* | 5/2003 | Srivastava | G06F 18/24147 382/226 |
| 8,949,677 | B1* | 2/2015 | Brundage | G06F 11/0745 714/48 |
| 11,449,743 | B1* | 9/2022 | Scott | G06N 7/01 |
| 2009/0132450 | A1* | 5/2009 | Schlottmann | G06N 3/02 706/46 |
| 2010/0260402 | A1* | 10/2010 | Axelsson | G06T 11/008 382/190 |
| 2011/0125477 | A1* | 5/2011 | Lightner | G05B 13/048 703/11 |
| 2012/0041575 | A1* | 2/2012 | Maeda | G05B 23/024 700/79 |
| 2012/0316981 | A1* | 12/2012 | Hoover | G06F 16/25 705/26.4 |
| 2016/0006872 | A1* | 1/2016 | Hamlin | G06Q 10/06395 379/265.06 |
| 2016/0062950 | A1* | 3/2016 | Brodersen | G06K 9/00 702/181 |
| 2017/0185668 | A1* | 6/2017 | Convertino | G06F 40/18 |
| 2018/0060150 | A1* | 3/2018 | Cunico | G06F 3/013 |

(Continued)

*Primary Examiner* — Irene Baker
(74) *Attorney, Agent, or Firm* — NORTON ROSE FULBRIGHT CANADA LLP

(57) ABSTRACT

Disclosed are systems, methods, and devices for data anomaly detection. A signal reflective of an input data set having a plurality of dimensions is received. Co-variance across said plurality of dimensions is assessed. Upon said assessing, at least a portion of the input data set is transformed into a dimensionality-reduced data set. For each given data point in the dimensionality-reduced data set, an anomaly score informative of whether said given data point is an anomaly is calculated.

18 Claims, 11 Drawing Sheets

(56) References Cited

U.S. PATENT DOCUMENTS

| | | | |
|---|---|---|---|
| 2018/0239682 A1* | 8/2018 | Kaluza | G06F 11/3006 |
| 2019/0050563 A1* | 2/2019 | Sander | G06F 16/287 |
| 2019/0108471 A1* | 4/2019 | Widanapathirana | G06Q 10/063114 |
| 2019/0129395 A1* | 5/2019 | Niemiec | G05B 23/0235 |
| 2020/0097351 A1* | 3/2020 | Raghavan | G06F 16/2465 |
| 2020/0110988 A1* | 4/2020 | Wang | G06N 3/063 |
| 2020/0293594 A1* | 9/2020 | Raissi | G06F 30/27 |
| 2020/0387818 A1* | 12/2020 | Chan | G06Q 10/06395 |
| 2020/0401916 A1* | 12/2020 | Rolfe | G06N 7/01 |
| 2021/0011890 A1* | 1/2021 | Mdini | G06F 16/212 |
| 2021/0026747 A1* | 1/2021 | Garion | G06F 11/3476 |

\* cited by examiner

| Variable A | Variable A Info | Variable B | Variable B Info | Test |
|---|---|---|---|---|
| Continuous | Normally distributed | Continuous | Normally distributed | Pearson's Correlation |
| Continuous | Normally distributed | Continuous | Not normally distributed | Spearman's $\rho$ |
| Continuous | Normally distributed | Discrete | More than two categories | F-Test |
| Continuous | Normally distributed | Discrete | Two categories | T-Test |
| Continuous | Not normally distributed | Discrete | More than two categories | Kruskal-Wallis |
| Continuous | Not normally distributed | Discrete | Two categories | Mann-Whitney U |
| Discrete | – | Discrete | – | $\chi^2$ Test |

FIG. 3

SYSTEM AND METHOD FOR MULTIVARIATE ANOMALY DETECTION

CROSS-REFERENCE TO RELATED APPLICATIONS

This application claims all benefit including priority to U.S. Provisional Patent Application 62/955,007, filed Dec. 30, 2019 and U.S. Provisional Patent Application 63/081,494, filed Sep. 22, 2020, both entitled "SYSTEM AND METHOD FOR MULTIVARIATE ANOMALY DETECTION"; the entire contents of both of which are hereby incorporated by reference herein.

FIELD

This disclosure relates to data anomaly detection, and more specifically to multivariate anomaly detection.

BACKGROUND

Data management servers may be configured to receive volumes of data sets from a plurality of data sources and may conduct operations for analyzing data entries of the data sets, such as detection of anomalies including, for example, outliers. Such anomalies may, for example, be indicative of control deficiencies in technological or business processes. However, data sets are often large and manual review of all data entries may be impractical or impossible. Approaches to reducing the amount of data to be manually reviewed include random sampling and judgement-based sampling. However, assessment of anomalies based on such approaches may not be reproducible and/or statistically sound.

SUMMARY

In accordance with an aspect, there is provided a computer-implemented method for data anomaly detection. The method includes receiving a signal reflective of an input data set having a plurality of dimensions; assessing co-variance across the plurality of dimensions; upon the assessing, transforming at least a portion of the input data set into a dimensionality-reduced data set; and for each given data point in the dimensionality-reduced data set, calculating an anomaly score informative of whether the given data point is an anomaly.

In accordance with another aspect, there is provided a computer-implemented system for data anomaly detection. The system includes at least one processor; memory in communication with the at least one processor, and software code stored in the memory, which when executed by the at least one processor causes the system to: receive a signal reflective of an input data set having a plurality of dimensions; assess co-variance across the plurality of dimensions; upon the assessing, transform at least a portion of the input data set into a dimensionality-reduced data set; and for each given data point in the dimensionality-reduced data set, calculate an anomaly score informative of whether the given data point is an anomaly.

In accordance with another aspect, there is provided a non-transitory computer-readable medium or media having stored thereon machine interpretable instructions which, when executed by a processor, cause the processor to perform a computer-implemented method of data anomaly detection. The method includes receiving a signal reflective of an input data set having a plurality of dimensions; assessing co-variance across the plurality of dimensions; upon the assessing, transforming at least a portion of the input data set into a dimensionality-reduced data set; for each given data point in the dimensionality-reduced data set, calculating an anomaly score informative of whether the given data point is an anomaly.

Many further features and combinations thereof concerning embodiments described herein will appear to those skilled in the art following a reading of the instant disclosure.

DESCRIPTION OF THE FIGURES

In the figures,

FIG. 3 shows a table of criteria for selecting a co-variance test, in accordance with an embodiment;

DETAILED DESCRIPTION

Computing servers may be configured to receive data sets from one or more data source devices, and such data sets may contain a large volume of data. The computing servers may be configured to analyze the received data sets to detect anomalies. In particular, the computing server may be configured to conduct operations to identify one or more data entries in a data set as an anomalous data point.

As detailed herein, in some embodiments, the operations conducted at the aforementioned computing servers may include transforming at least a portion of received data set into a dimensionality-reduced data set and identifying anomalous data entries using such transformed data.

Conveniently, in some embodiments, the transformation of data into dimensionality-reduced data improves computational efficiency. For example, in such embodiments, anomalous data entries are identified using operations applied to a smaller data set (reflecting fewer dimensions), thereby allowing such operations to use less computing resources, e.g., less memory and/or less time.

Conventionally, efforts to reduce computational burden have relied on random sampling or judgment-based sampling to reduce the amount of data to be operated upon. Detection of anomalous data according to some embodiments does not require random sampling or judgment-based sampling, and hence associated biases and errors can be avoided. Further, in accordance with some embodiments, detection outputs are reproducible and explainable.

Figure 1:
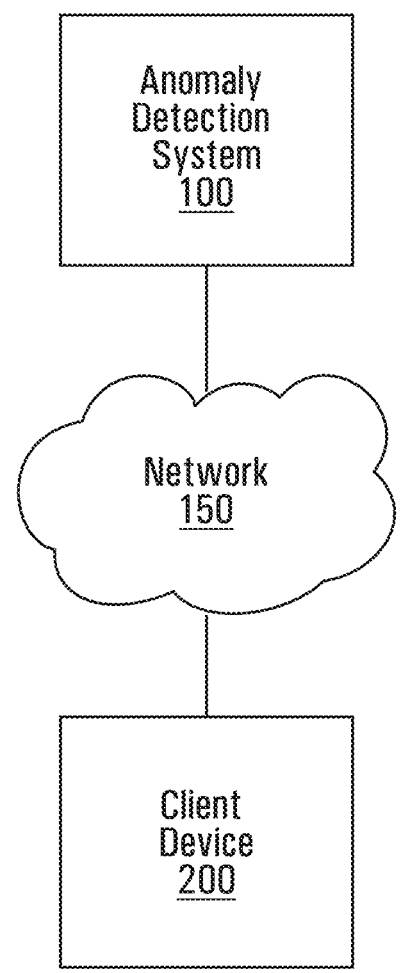
FIG. 1 is a network diagram including a data anomaly detection system, in accordance with an embodiment.

FIG. 1 depicts an anomaly detection system 100, in accordance with an embodiment. System 100 transmits and/or receives signals reflective of data messages to and/or from a client device 200 via a network 150.

In one example, system 100 receives signals reflective of an input data set to be processed at system 100 for detection of anomalies in manners disclosed herein. An input data set includes a plurality of data entries corresponding to a plurality of data points. Each data point may be defined by the values of a plurality of variables (which may also be referred to herein as features), and thus each data point may span a plurality of dimensions of those variables. Such an input data set may be referred to as a multivariable or multi-dimensional data set. A data entry for a data point includes data reflective of values of the variables of that data point.

In another example, system 100 transmits a signal reflective of an indicator of whether a particular data point (of a particular data entry) is an anomaly, as detected at system 100. In another example, system 100 transmits a signal reflective of an anomaly score that is informative of whether a data point is an anomaly. For example, the anomaly score may be informative of the degree of risk that a data point is an anomaly, informative of a likelihood that a data point is an anomaly, or the like.

Network 150 may include a wired or wireless wide area network (WAN), local area network (LAN), the Internet, or the like, or a combination thereof.

In FIG. 1, a single client device 200 is illustrated; however, system 100 may transmit and/or receive data messages to/from one or more client devices 200 via network 150. In one example, a client device 200 is a data source device and transmits signals reflective of one or more data sets to system 100. In another example, a client device 200 is an output display device, and receives signals reflective of outputs of anomaly detection from system 100.

Each client device 200 may be a computing device that includes a processor, memory, and a communication interface, such as a desktop computer, a laptop computer, a tablet computer, a smartphone, or the like.

Figure 2:
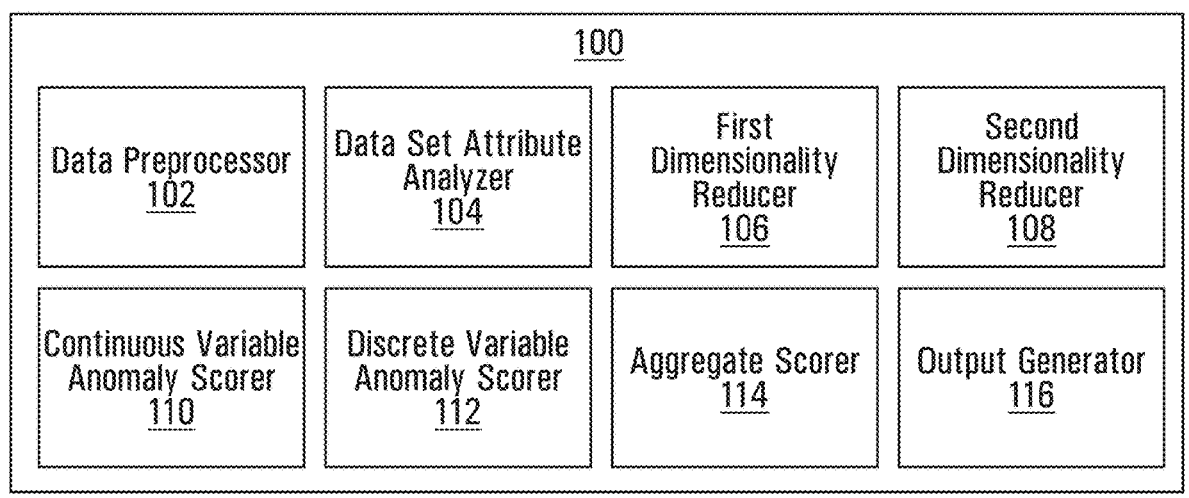
FIG. 2 is a schematic diagram of the data anomaly detection system of FIG. 1, in accordance with an embodiment.

As depicted in FIG. 2, anomaly detection system 100 includes a data preprocessor 102, a data set attribute analyzer 104, a first dimensionality reducer 106, a second dimensionality reducer 108, a continuous variable anomaly scorer 110, a discrete variable anomaly scorer 112, an aggregate scorer 114, and an output generator 116.

Preprocessor 102 processes a data set received at anomaly detection system 100 to determine the amount of missing data in each variable (e.g., along each dimension). For variables having a quantity of missing data exceeding a predefined threshold, the variable is converted to a binary variable with a value indicating whether data is present or absent. In the depicted embodiment, this threshold for missing data is defined to be 85%. In other embodiments, this threshold may vary, e.g., be 50%, 75%, 90%, etc.

Data set attribute analyzer 104 processes a data set to determine attributes of the data set including attributes of the data set and/or attributes of variables of the data set. Attributes of the data set that can be determined by data set attribute analyzer 104 include, for example, the number of variables (e.g., the number of dimensions), the number of those variables that are continuous variables, the number of those variables that are discrete variables, or the like. Discrete variables include variables having a finite number of categories (also known as classes). A discrete variables may also be referred to as a "categorical variable" with a specific example being a binary variable.

Attributes of a variable that may be determined by data set attribute analyzer 104 include, for example, whether the variable is a continuous variable or a discrete variable, and whether values of that the variable in the input data set has a particular distribution, e.g., whether or not the values are normally distributed.

First dimensionality reducer 106 processes a data set according to a first method to assess co-variance across dimensions of the data set (i.e., co-variance across variables), and upon assessing the co-variance, transforms the data set into a dimensionality-reduced data set.

Second dimensionality reducer 108 processes a data set according to a second method to assess co-variance across dimensions of the data set (i.e., co-variance across variables), and upon assessing the co-variance, transforms the data set into a dimensionality-reduced data set.

First dimensionality reducer 106 is used under first conditions, e.g., when the attributes of the data set meet certain criteria, and second dimensionality reducer 108 is used under second conditions, e.g., when the attributes of the data set meet certain other criteria. For example, system 100 may select one of first dimensionality reducer 106 or second dimensionality reducer 108 according to attributes of the data set, e.g., as analyzed by data set attribute analyzer 104.

In the depicted embodiment, first dimensionality reducer 106 is used when the number of continuous variables in the input data set is less than or equal to a pre-defined threshold, and second dimensionality reducer 108 is used when the number of continuous variables in the input data set exceeds this threshold. In other embodiments, other criteria may be used to select which of first dimensionality reducer 106 and second dimensionality reducer 108 is used.

In the depicted embodiment, first dimensionality reducer 106 is used when there are ten or fewer continuous variables, and second dimensionality reducer 108 is used when there are more than ten continuous variables. In other embodiments, this threshold could be set to five variables, fifteen variables, etc.

First dimensionality reducer 106 assesses co-variance across dimensions of the data set by assessing pairwise combination of variables of the data set, to determine whether any pairs of variables are significantly associated with one another. First dimensionality reducer 106 assesses pairwise combinations of variables by applying, for each pair, a co-variance test selected from a bank of tests, as shown in Table 300 of FIG. 3.

As shown, for pairs of variables (i.e., a variable A and a variable B), the particular co-variance test applied depends on attributes of the variables, including whether variable A is continuous or discrete, whether variable A is normally distributed or not, whether variable B is continuous or discrete, and whether variable B is normally distributed or not. The bank of tests includes a Pearson's correlation, a Spearman's correlation, an F-Test, a T-Test, a Kruskal-Wallis, a Mann-Whitney U Test, and a $\chi^2$ Test, for example. In other embodiments, the bank of tests can include a different combination of tests including other tests known to persons of ordinary skill.

The output of each co-variance test, e.g., a p value, is adjusted to account for a false discovery rate to produce a corresponding q value. The q value is compared to a pre-defined threshold to determine whether a statistically significant association between two variables is found, e.g., when q<0.05. This threshold may vary from embodiment to embodiment, e.g., 0.01, 0.1, etc.

When a statistically significant association between two variables is found, data for one of the variables is removed from the data set, e.g., removed from each data point in the data set. In some embodiments, keeping continuous variables is prioritized over keeping discrete variables. In some embodiments, keeping categorical variables is prioritized over keeping binary variables. Progressively removing variables from the data set, upon pairwise testing, causes the transformation of the input data set into a dimensionality-reduced data set. Conveniently, this manner of dimensionality reduction allows data to be preserved while reducing possible bias.

Discrete variables are further assessed for whether they are to be left in the data set using a $\chi^2$ test with a uniform distribution as the expectation. For a given discrete variable, if the p value is less than 0.05 (or another pre-defined threshold), then the discrete variable is determined to include under-represented classes and is kept. Otherwise, the discrete variable is removed from the data set, e.g., removed from each data point in the data set.

Second dimensionality reducer 108 applies principal component analysis (PCA) to assess co-variance and transform the input data set into a dimensionality-reduced data set. Second dimensionality reducer 108 processes the discrete variables and the continuous variables separately. Discrete variables are assessed for whether they should be included in the transformed data set in manners described for the first dimensionality reducer 106, e.g., by using a $\chi^2$ test with a uniform distribution as the expectation.

For each continuous variable, the values for that variable are normalized to have a value between 0 and 1. The data set is supplemented by imputing missing data points to have a value equal to the median value of the variable. PCA is then applied on the set of normalized and supplemented data points, and a dimensionality-reduced data set is generated. In accordance with PCA, a sufficient number of components are kept in the dimensionality-reduced data set to account for at least a desired percentage of the variance. In the depicted embodiment, this percentage value is 90%. Of course, this percentage can be adjusted and other percentage values (e.g., 80%, 85%, 95%, etc.) may also be used.

Continuous variable anomaly scorer 110 processes the dimensionality-reduced data set to calculate anomaly scores for continuous variables remaining in the dimensionality-reduced data set. For each continuous variable, an anomaly score is calculated for a given data point based on the value of the continuous variable of the given data point. As noted, the anomaly score may be informative of whether the given data point is an anomaly. In the depicted embodiment, for each variable, an interquartile range (IQR) is calculated and a median value is calculated. The anomaly score for the variable value of a given data point is calculated as the quantity of IQRs the variable value is away from the median value, with an upper bound set to twice the IQR.

For each continuous variable, the calculation of an anomaly score is repeated for each data point. The anomaly scores for that continuous variable are then normalized across data points, e.g., to be within 0 and 1. The calculation of anomaly scores is repeated for each continuous variable.

Discrete variable anomaly scorer 112 processes the dimensionality-reduced data set to calculate anomaly scores for discrete variables remaining in the dimensionality-reduced data set. For each discrete variable, an anomaly score is calculated for a given data point based on the value of discrete variable of the given data point. As noted, the anomaly score may be informative of whether the given data point is an anomaly. In the depicted embodiment, discrete variable anomaly scorer 112 calculates the score for each data point as the inverse value of the frequency of the discrete variable value (e.g., the class or category) of that data point. As a consequence, infrequent classes are assigned a higher score.

For each discrete variable, the calculation of an anomaly score is repeated for each data point. The anomaly scores for that discrete variable are then normalized across data points, e.g., to be within 0 and 1. The calculation of anomaly scores is repeated for each discrete variable.

Aggregate scorer 114 calculates an aggregate score for each data point. For example, for a data point spanning, an aggregate anomaly score is calculated by combining the anomaly scores calculated for each of the variables (e.g., each of dimensions) of that data point. In some embodiments, for a data point, anomaly scores are combined by summing the values of constituent anomaly scores. In other embodiments, the aggregate score is calculated as one of a mean, a medium, a product, a sum of squares, a root sum of squares, or a root mean square, a combination of the foregoing, or the like.

In some embodiments, aggregate scorer 114 calculates an aggregate anomaly score by combining anomaly scores from a plurality of data points. For example, a total score may be calculated for an input data set, or a subset thereof.

Output generator 116 generates various forms of output signals based on the anomaly detection operations performed at system 100. These signals may reflect, for example, an anomaly score and/or an aggregate anomaly score. These signals may reflect, for example, an indicator of whether a given data point is an anomaly. In some embodiments, output generator 116 may generate an indicator that a data point is anomaly for the top 1% of anomaly scores. Of course, this threshold may be adjusted to any desired value (e.g., 0.5%, 2%, etc.). In some embodiments, this threshold may be dynamically adjusted, e.g., based on various factors including the size of the input data set. In some embodiments, anomalies may be identified according to an unsupervised density-based clustering method. In some embodiments, output generator 116 generates labels of whether data points are anomalous or not, which may be provided as metadata descriptive of a data set.

In some embodiments, output generator 116 may generate a graphical representation reflective of the anomaly detection operations performed at system 100. For example, such graphical representation may include graphical indicators of whether a data point is an anomaly. In some embodiments, signals reflective of a graphical representation or parts thereof may be transmitted to a client device 200 for display.

Figure 4:
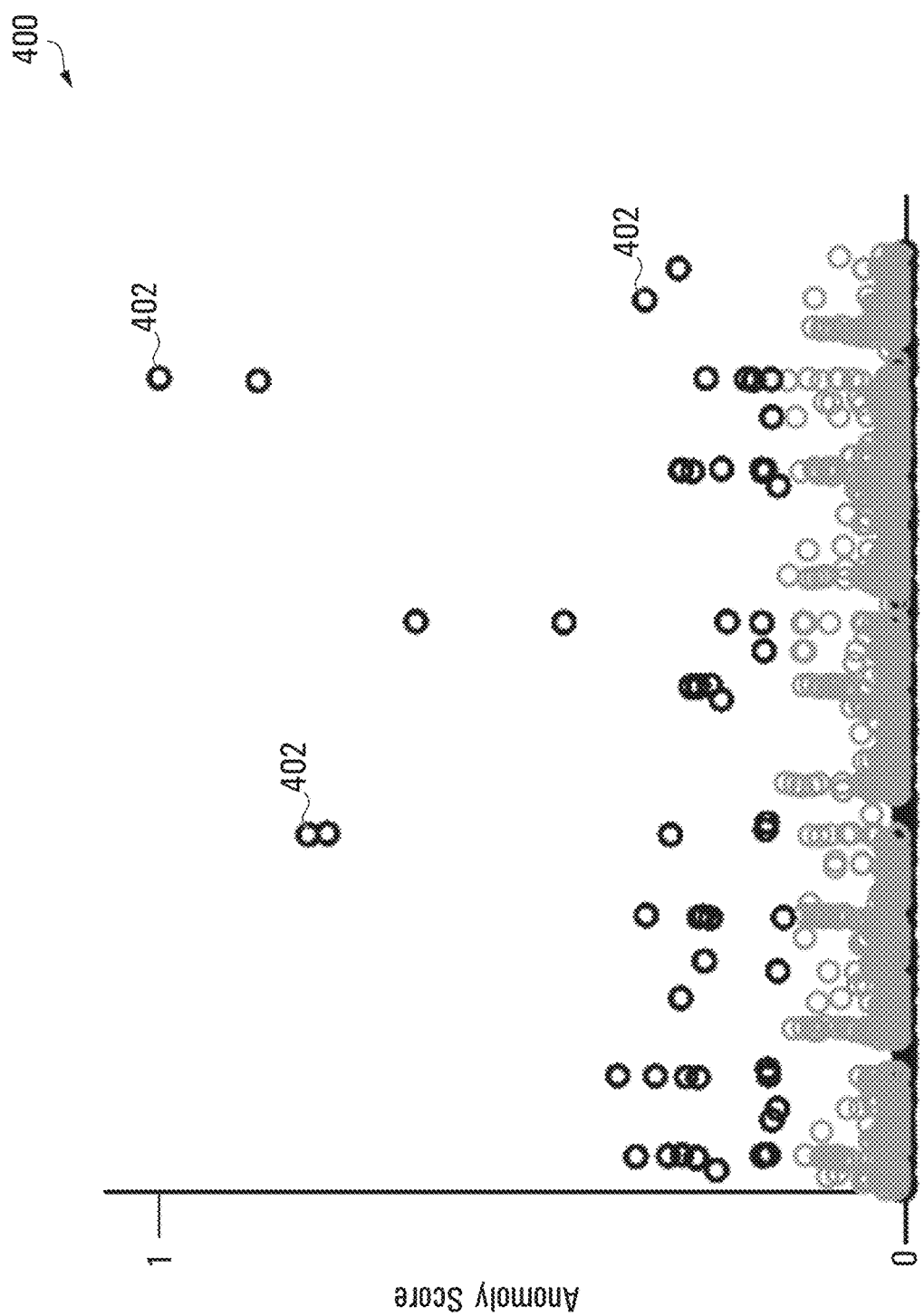
FIG. 4, FIG. 5, FIG. 6, each is a graphical representation of output generated at the data anomaly detection system of FIG. 1, in accordance with an embodiment.

FIG. 4 shows an example graphical representation generated by output generator 116, showing identified anomalies 402 (dark-colored circles) amongst a plurality of other data points (light-colored circles) of a data set, for a plurality of variables along the x-axis.

Figure 5:
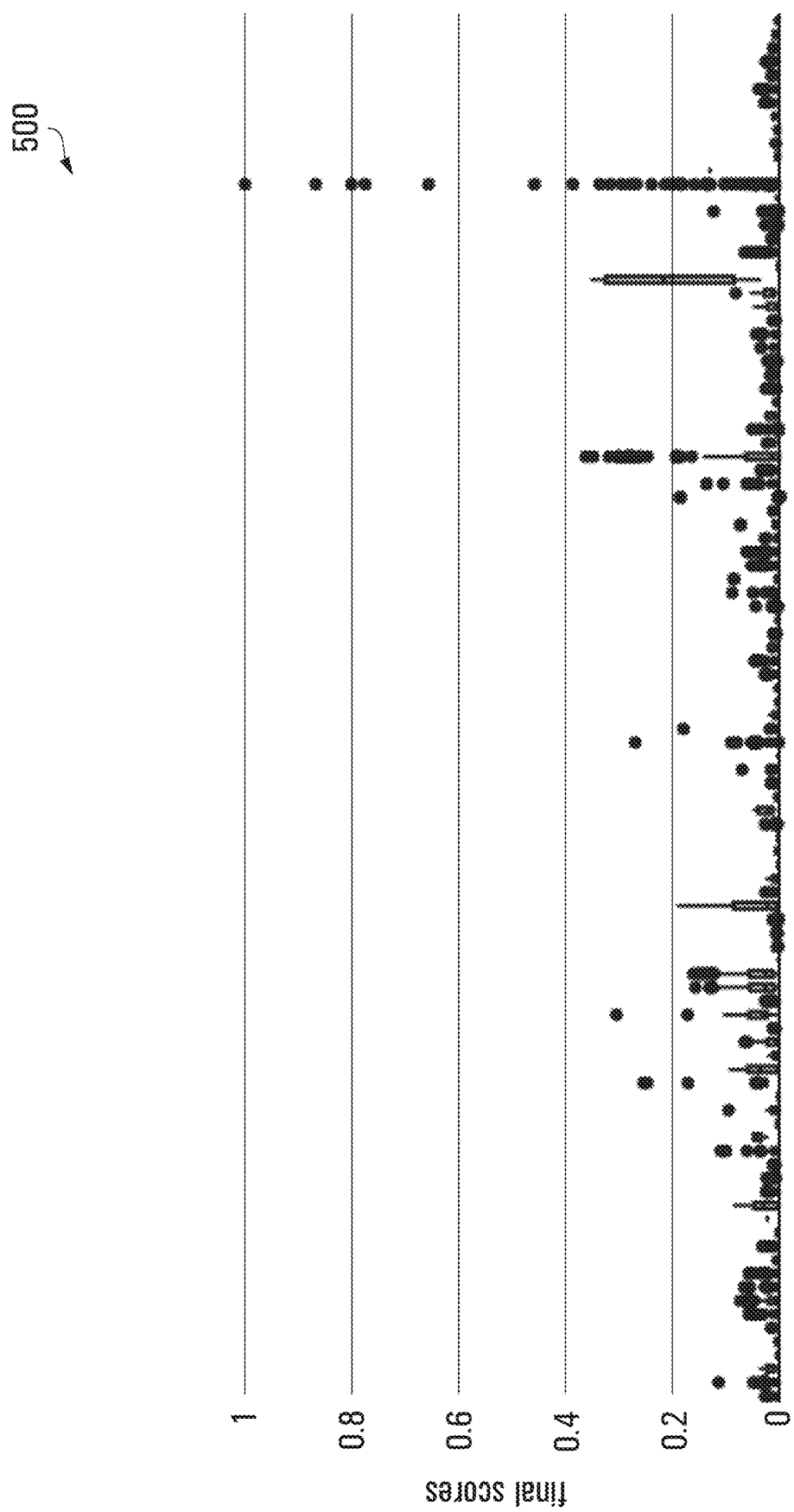

FIG. 5 shows another example graphical representation generated by output generator 116, namely, a box and whisker plot that shows the distribution of anomaly scores of various variables. In this plot, boundaries of the boxes indicate the 25th-75th percentile of the data so that 50% of the data sits within the boxes for that particular column. The upper whiskers show the boundaries of the 75th percentile (or 3rd quartile) plus 1.5×IQR (interquartile range, which is the difference between the 75th percentile point and the 25th percentile point), while the lower whisker shows the 25th percentile (1st quartile) minus 1.5×IQR. Some columns do not show whiskers or a box, indicating that there is insufficient data for that column or that the distribution of the data in that column is very narrow relative to the rest of the columns.

Figure 6:
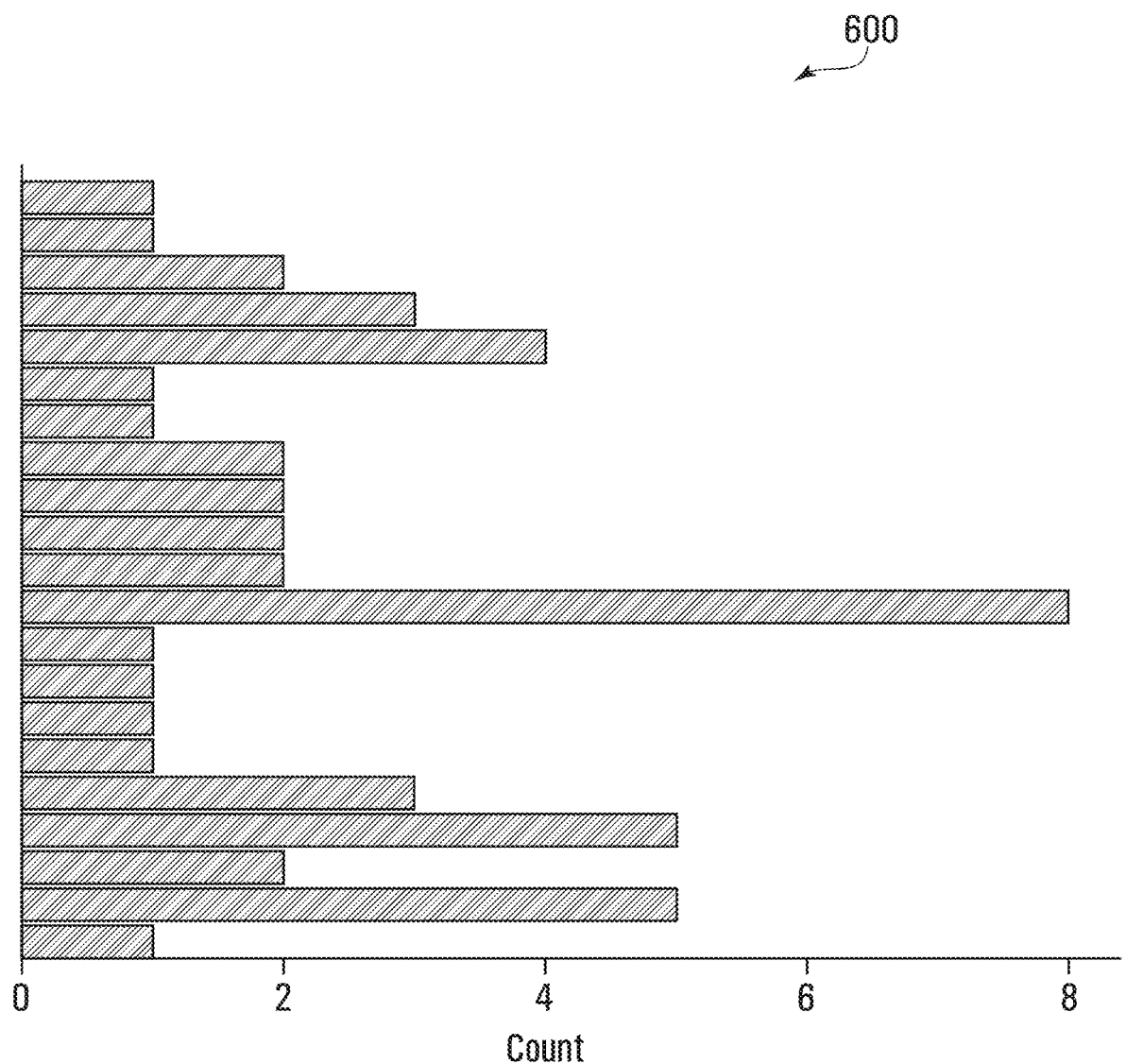

FIG. 6 shows another example graphical representation generated by output generator 116. This bar chart shows the number of anomalies as a function of values of a given variable.

The graphical representations generated by output generator 116 may be used, e.g., by an operator of client device 200, to pinpoint problem areas, e.g., particularly problematic variables or particularly problematic categories.

Each of data preprocessor 102, data set attribute analyzer 104, first dimensionality reducer 106, second dimensionality reducer 108, continuous variable anomaly scorer 110, discrete variable anomaly scorer 112, aggregate scorer 114, and output generator 116 may be implemented using conventional programming languages such as Java, J #, C, C++, C #, R, Perl, Visual Basic, Ruby, Scala, etc. These components of system 100 may be in the form of one or more executable programs, scripts, routines, statically/dynamically linkable libraries, or servlets.

The operation of system 100 is further described with reference to the flowchart depicted in FIG. 7. System 100 performs the example operations depicted at blocks 700 and onward, in accordance with an embodiment.

At block 702, system 100 receives a signal reflective of an input data set having a plurality of dimensions. Preprocessor 102 processes the input data set. Data set attribute analyzer 104 analyzes the input data set to determine attributes of the input data set.

Figure 7:
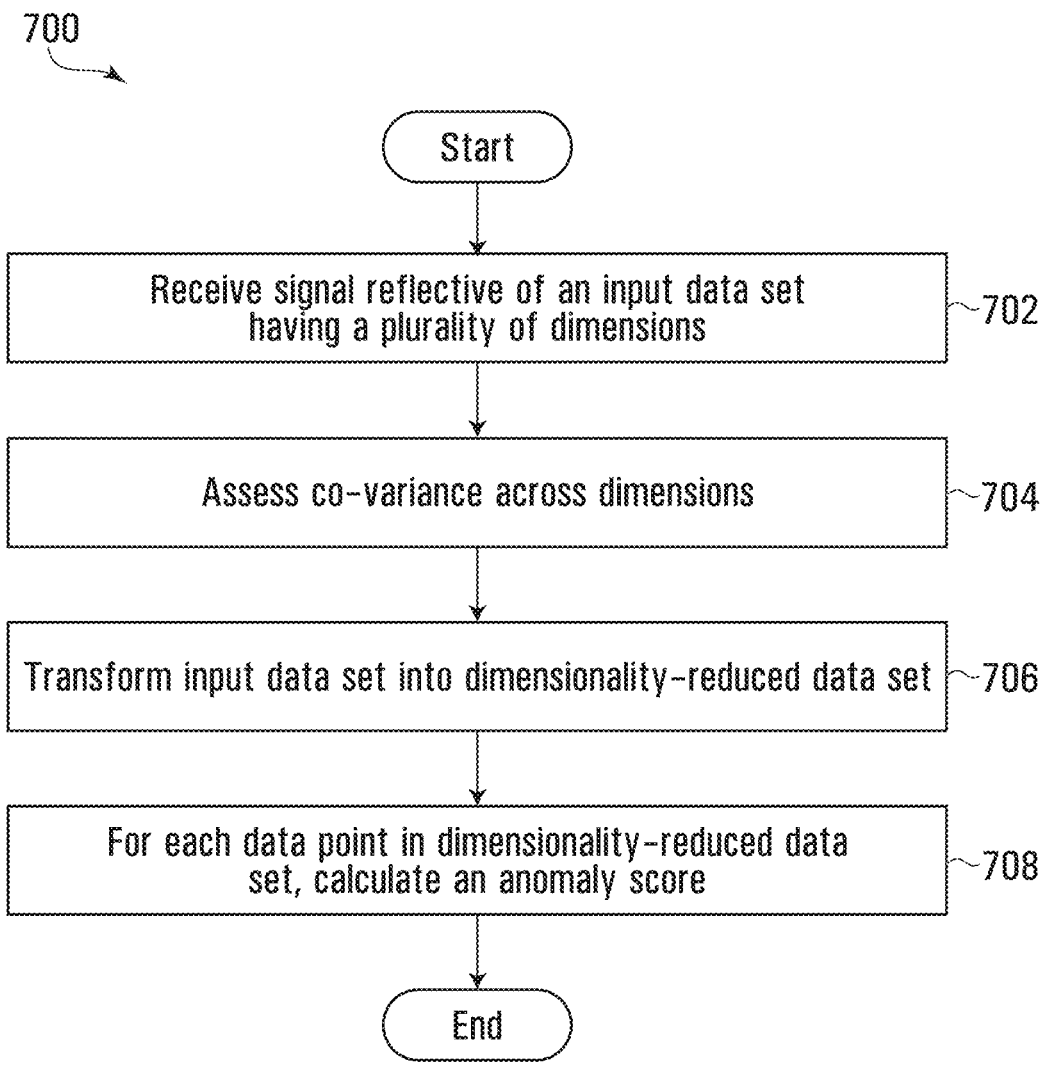
FIG. 7 is a flowchart of example operations performed at the data anomaly detection system of FIG. 1, in accordance with an embodiment.

In the embodiment depicted in FIG. 7, the particular operations performed at system 100 depends on one or more attributes of the input data set (or one or more attributes of its variables) as determined by data set attribute analyzer 104. For example, upon determining that the number of continuous variables is less than or equal to a pre-defined threshold, system 100 dynamically configures itself to perform operations under first conditions. However, upon detecting that the number of continuous variables is more than the pre-defined threshold, system 100 dynamically configures itself to perform operations under second conditions.

At block 704, system 100 assesses co-variance across dimensions of the data set. Such assessment is performed by first dimensionality reducer 106 when system 100 is operating under the first conditions and is performed by second dimensionality reducer 108 when system 100 is operating under the second conditions.

At block 706, system 100 transforms the input data set into a dimensionality-reduced data set. Such transformation is performed by first dimensionality reducer 106 when system 100 is operating under the first conditions and is performed by second dimensionality reducer 108 when system 100 is operating under the second conditions.

At block 708, data point values of continuous variables in the dimensionality-reduced data set are scored by continuous variable anomaly scorer 110, while data point values of discrete variables in the dimensionality-reduced data set are scored by discrete variable anomaly scorer 112. Aggregate anomaly scores for each data point are calculated by aggregate scorer 114. Outputs of the anomaly detection and anomaly scoring operations are generated by output generator 116.

It should be understood that steps of one or more of the blocks depicted in FIG. 7 may be performed in a different sequence or in an interleaved or iterative manner. Further, variations of the steps, omission or substitution of various steps, or additional steps may be considered.

In some embodiments, system 100, upon receiving signals reflective of an input data set, divides the input data set into a plurality of subsets, based on at least one characteristic of data points in the data set.

In one example, the input data set may be divided into subsets according to values of one or more variables in the data set. In another example, the input data set may be divided into subsets according to other attributes of data points in the data set, where such other attributes may be stored in an separate data structure. In yet another example, the input data set may be divided into subsets according to a clustering algorithm operating on the data points in the data set.

Dividing the input data set may include for example, generating a plurality of data structures, each storing data for one of the plurality of subsets.

Each subset of data is processed in manners described herein to detect anomalies within the subset. For example, data set analyzer 104 processes each subset to determine attributes of the subset. Each subset is separately transformed into a dimensionality-reduced form, e.g., by first dimensionality reducer 106 or second dimensionality reducer 108. Anomaly scores are generated for each subset, e.g., by applying continuous variable anomaly scorer 110 to continuous variables in the dimensionality-reduced subset, and by applying discrete variable anomaly scorer 112 to discrete variables in the dimensionality-reduced subset. Aggregate anomaly scores for data points in each subset are calculated by aggregate scorer 114.

The scores for the various subsets can be grouped for processing by output generator 116, or for other analysis.

Preprocessing by preprocessor 102 may be applied to the input data before it is divided into subsets, or it may be applied to each subset.

Dividing an input data set into a plurality of subsets allows anomaly scores to be calculated independently for each subset. Further, anomaly scores may be normalized within each subset. This facilitates detection of anomalies within each subset, and comparison of anomaly scores across subsets.

Use Cases

In example applications, system 100 may be applied to detect anomalies to support a quality assurance process for a product or service. For such applications, the input data set may include, for example, variables reflecting characteristics of the product or service, e.g., time taken, steps taken, identifiers of an individual who manufactured the product or performed the service. System 100 performs operations described herein to find anomalies within this input data set.

In one specific example application, the quality assurance process is applied to a financial service of underwriting retail credit to ensure that prescribed policies and procedures are followed. In this application, the input data includes data, for example, a unique identifier for an employee reviewing a loan application, a unique identifier for a loan application, a loan amount, an outstanding loan balance, a total debt service (TDS) ratio of the applicant, an income of the applicant, the time taken by the employee to review the loan application, or the like.

In another specific example application, the quality assurance process is applied to a financial service of extending an automotive loan or extending a mortgage.

In example applications, system 100 may be applied to detect anomalies to support audit of an incident ticket management system, e.g., for providing information technology support for an organization. For such applications, the input data set may include, for example, variables reflecting a duration between when a support ticket is opened and when the incident is resolved, a duration between when a support ticket is opened and when the ticket is closed, a unique identifier of the support agent, the time spent by the support agent, an identifier of a computer application for with support was sought (which may be referred to as an "App code"), a current state of the support ticket (e.g., open or closed), a priority level for the support ticket (e.g., low priority, medium, priority, or high priority), or the like.

Figure 8A:
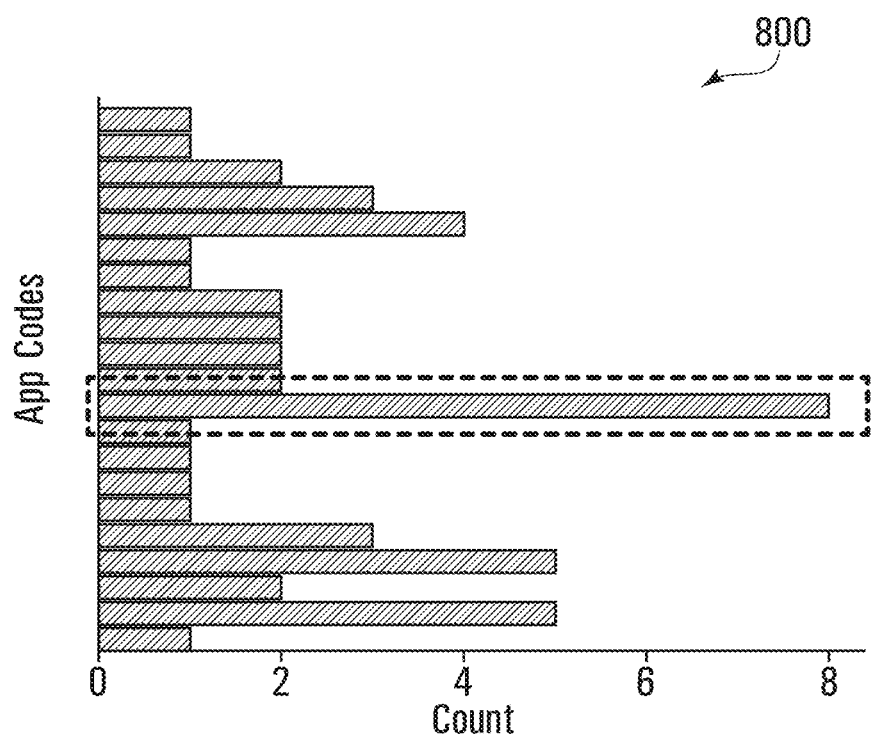
FIG. 8A, FIG. 8B, FIG. 9 and FIG. 10 each is a graphical representation of output generated at the data anomaly detection system of FIG. 1, in accordance with an embodiment.
Figure 8B:
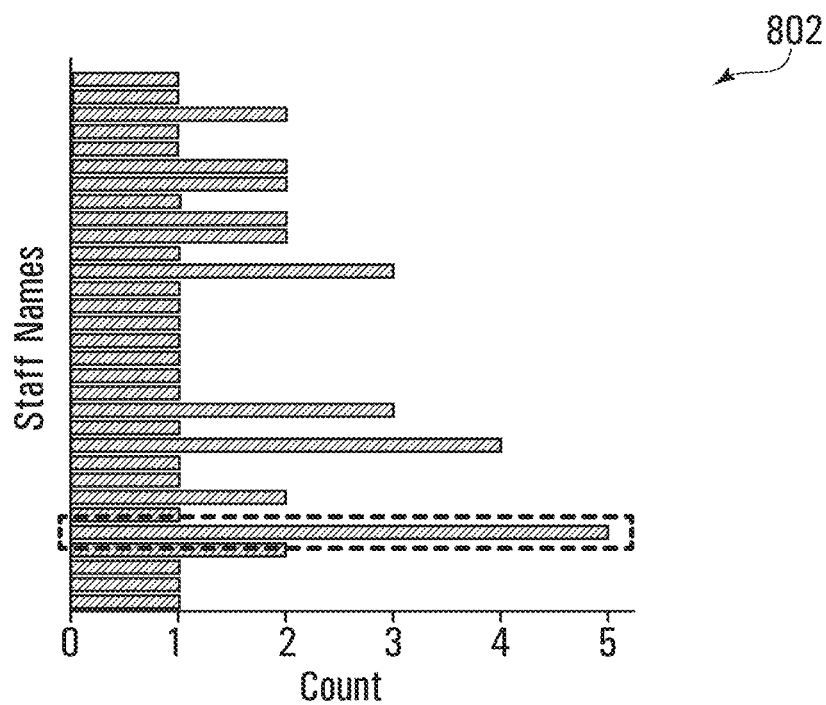

Output generator 116 can be used generate a graphical representation of a count of anomalies plotted against particular variable values. FIG. 8A shows an example plot 800 in which a count of anomalies is plotted against App codes, which may indicate for example, that a particular application (boxed in FIG. 8A) is a disproportionate cause of anomalous support tickets. FIG. 8B shows another example plot 802 in which a count of anomalies is plotted against an identifier of the support agents (e.g., a name), which may indicate that a particular agent (boxed in FIG. 8B) is a disproportionate cause of anomalous support tickets. Such an agent may be automatically flagged, e.g., for additional training.

In example applications, system 100 may be applied to detect anomalies to support audit of securities lending contractual agreements. Each contractual agreement may be modeled as a set of rules. For such applications, the input data set may include, for example, variables reflecting identifiers of groups of contractual agreements sharing one or more rules, and a count of how many contractual agreements are in each group. In such applications, system 100 may, for example, detect agreements that are anomalous in that they have unique or rare rules relative to other agreements.

In example applications, system 100 may be applied to detect anomalies among transactions in a banking or investment account. For such applications, the input data set may include, for example, variables reflecting a type of transaction (e.g., buy, sell, withdraw), a monetary amount of the transaction, a transaction date, a unique identifier of the account, etc. In such applications, system 100 may, for example detect anomalies that are erroneous or fraudulent transactions.

In such applications, anomaly scores (or aggregate anomaly scores) may be calculated upon dividing the input data sets into a plurality of subsets in manners described above, e.g., where each subset corresponds to one transaction type. In this way, anomalies may be detected within each subset of transactions, e.g., for each transaction type.

Figure 9:
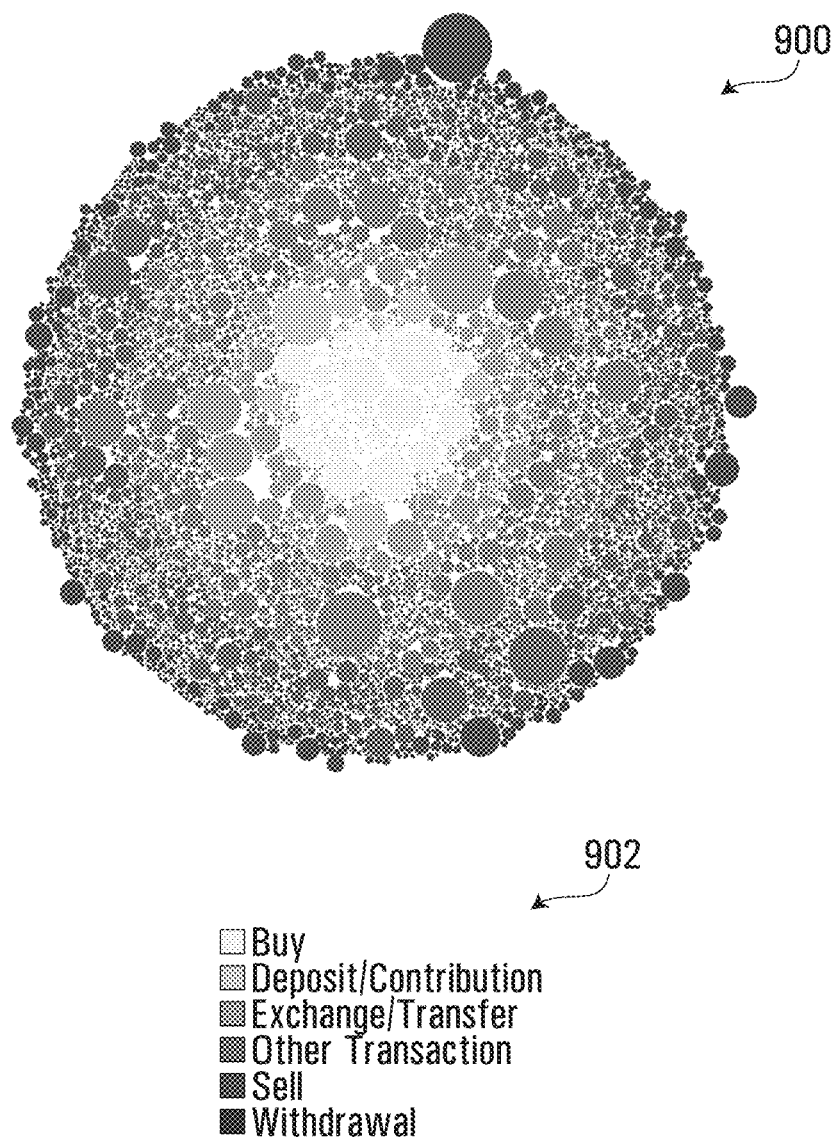
Figure 10:
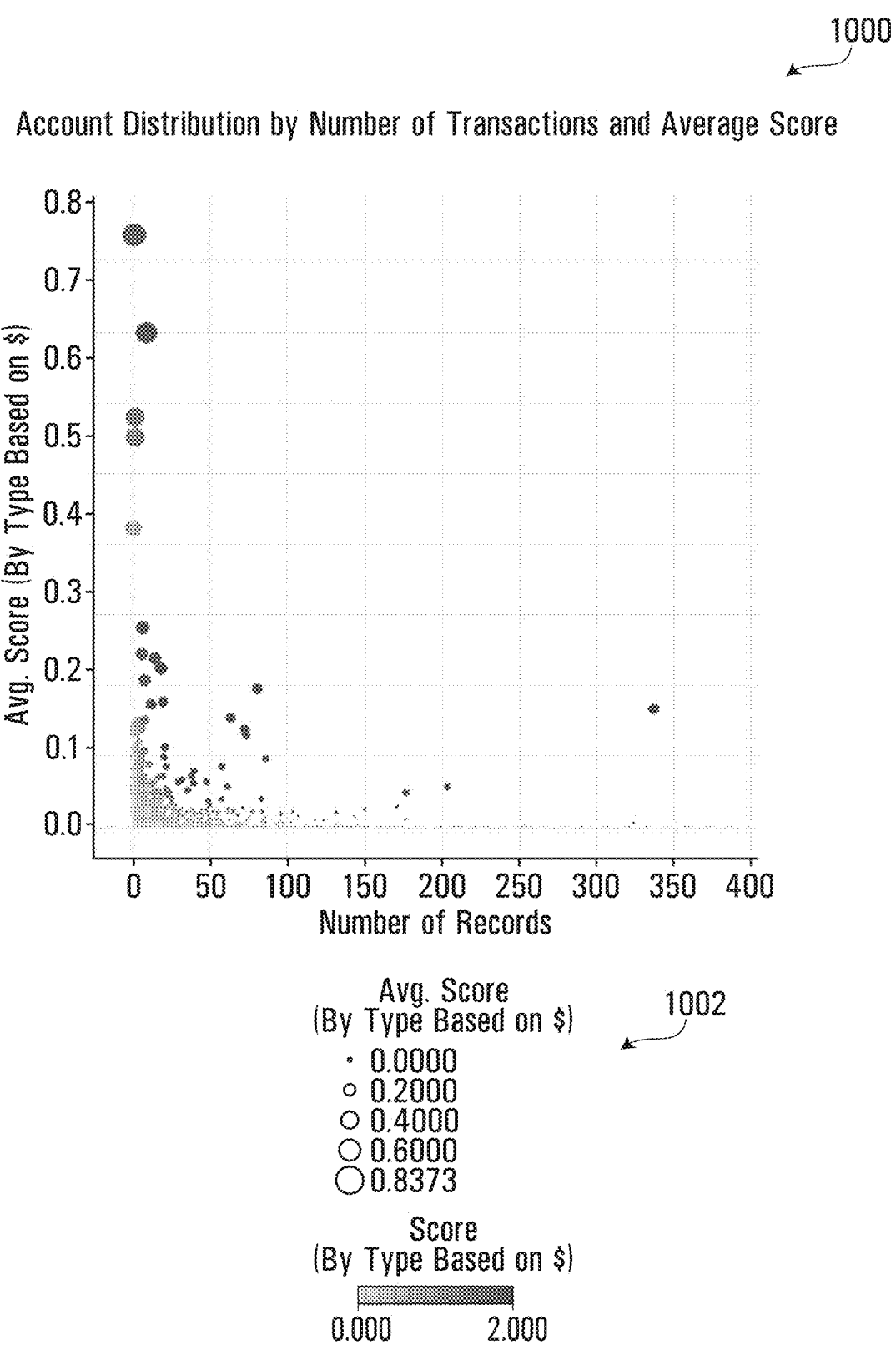

FIG. 9 shows an example graphical representation 900 generated by output generator 116 presenting anomaly scores generated for various types of transactions. In this graphical representation, each dot represents one transaction, where the size of the dot is proportional to an anomaly score calculated for that transaction and the shading of the dot represents the type of transaction, per legend 902. Notably, although anomaly scores can be calculated for each type of transaction separate (e.g., as a subset of the input data set), they can be combined to be displayed together.

FIG. 9 shows another example graphical representation 1000 generated by output generator 116 showing an average anomaly score for all transactions in a particular account plotted against a count of the number of transactions within that account.

In example applications, identified anomalous data points may be associated with control deficiencies in business processes, such as a data points that may be erroneous, likely approved without sufficient scrutiny, fraudulent, or may have some other characteristic that may warrant increased data scrutiny.

In example applications, system 100 may receive data sets associated with journal entries representing details of a resource transfer. Such resources may include, for example, monetary resources, tokens, precious metals, digital currency, or other types of resources. A data point may include various variable values associated with a resource transfer (e.g., monetary transaction between a sender and a receiver) and the duration of time between when the journal entry was created and when the journal entry was approved (e.g., approval to transfer resource). The data point may include data values associated with identification of a user/organizational title of the user (e.g., director of finance) approving the data point, textual description of the data point, or other characteristics.

Figure 11:
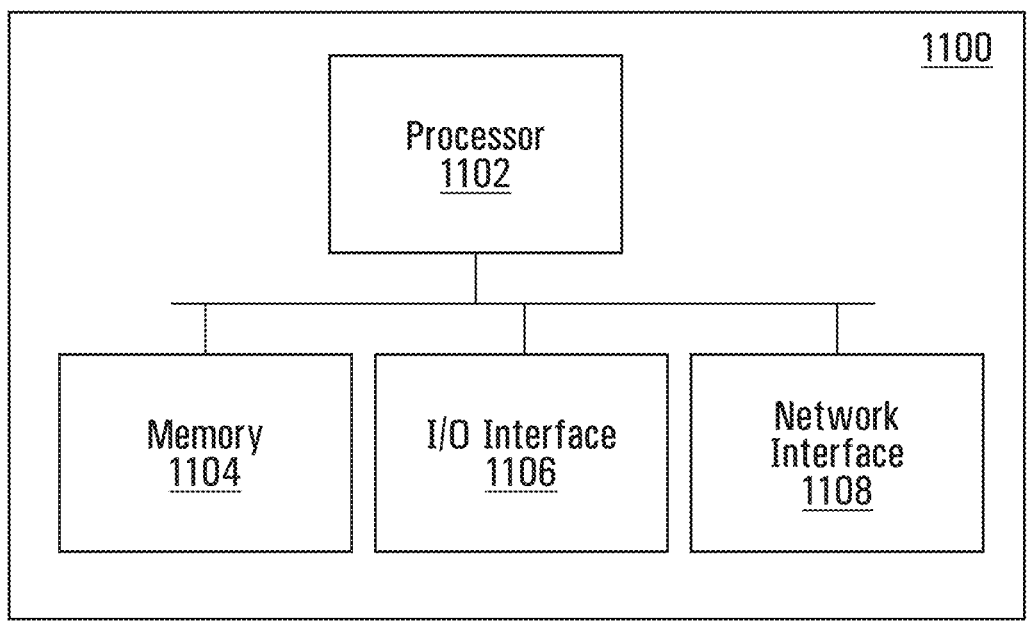
FIG. 11 is a schematic diagram of a computing device that implements the system FIG. 1, in accordance with an embodiment.

FIG. 11 is a schematic diagram of a computing device 1100 that implements system 100, exemplary of an embodiment. As depicted, computing device 1100 includes one or more processors 1102, memory 1104, one or more I/O interfaces 1106, and, optionally, one or more network interfaces 1108.

Each processor 1102 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1104 may store code executable at processor 1102, which causes system 100 to function in manners disclosed herein. Memory 1104 includes a data storage. In some embodiments, the data storage includes a secure data store. In some embodiments, the data storage stores received data sets, such as textual data, image data, or other types of data.

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network such as network 150 (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system 100 that includes multiple computing devices 1100. The computing devices 1100 may be the same or different types of devices.

Each computing devices may be connected in various ways including directly coupled, indirectly coupled via a network, and distributed over a wide geographic area and connected via a network (which may be referred to as "cloud computing").

For example, and without limitation, each computing device 1100 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Computing device 1100 may be used to implement a client device 200.

Some embodiments performing the operations for anomaly detection and anomaly scoring provide certain advantages over manually assessing anomalies. For example, in some embodiments, all data points are assessed, which eliminates subjectivity involved in judgement-based sampling, and may provide more statistically significant results than random sampling. Further, the outputs produced by some embodiments of system 100 are reproducible and explainable.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:
1. A computer-implemented method for data anomaly detection, said method comprising:

receiving a signal reflective of an input data set having a plurality of dimensions, the input data set associated with an audit process of an incident ticket management system;

processing the input data set to determine at least one attribute of each variable in the input data set, the at least one attribute including whether a variable is continuous or discrete;

providing the input data set and the at least one attribute of each variable to a dimensionality reduction architecture comprising a first dimensionality reducer and a second dimensionality reducer; wherein the first dimensionality reducer is configured to execute a first co-variance test, and the second dimensionality reducer is configured to execute a second co-variance test; wherein the first co-variance test and/or the second co-variance test includes determining with at least one processor co-variance across said plurality of dimensions, wherein said assessing co-variance includes, for each pair of two variables in a plurality of pairwise combinations of variables in the input data set;

transforming, with the dimensionality reduction architecture, the input data set into a dimensionality-reduced data set using the first dimensionality reducer or the second dimensionality reducer, wherein the dimensionality reduction architecture selects the first dimensionality reducer or the second dimensionality reducer based on a count of the number of continuous variables in the input data set;

wherein the transforming includes: when the selected first or second dimensionality reducer determines that the two variables associated with their respective co-variance test is statistically significant based on a pre-defined threshold, transforming at least a portion of said input data set into a dimensionality-reduced data set by removing data for one of the two variables associated with the respective co-variance test;

for each given data point in said dimensionality-reduced data set, calculating an anomaly score informative of whether said given data point is an anomaly, wherein for at least one data point in the dimensionality-reduced data set, calculating the anomaly score for the at least one data point comprises calculating a quantity of an interquartile range (IQR) based on a distance between the at least one data point and a median value, wherein an upper bound of the anomaly score is set to twice the IQR;

generating signals representing a graphical indicator for rendering within a graphical user interface to indicate the anomaly score, wherein the generated signals comprise a signal for displaying the graphical indicator in a shading determined based on a respective attribute of the at least one data point, wherein the graphical indicator represents an identifier of an application as a cause for the anomaly associated with the incident ticket management system; and transmitting the signals representing the graphical indicator to a client device for display.

2. The computer-implemented method of claim 1, further comprising calculating an aggregate anomaly score by combining a plurality of said anomaly scores.

3. The computer-implemented method of claim 1, wherein said at least one attribute includes whether said variable is normally distributed.

4. The computer-implemented method of claim 1, wherein said at least one attribute includes whether said variable is continuous.

5. The computer-implemented method of claim 1, wherein said plurality of co-variance tests includes at least two of a Pearson's correlation, a Spearman's correlation, an F-Test, a T-Test, a Kruskal-Wallis, a Mann-Whitney U Test, and a $\chi^2$ Test.

6. The computer-implemented method of claim 1, wherein at least one of said assessing co-variance and said transforming said input data set includes applying steps of principle component analysis.

7. The computer-implemented method of claim 6, wherein said applying is upon determining that a count of continuous variables in said input data set exceeds a pre-defined threshold.

8. The computer-implemented method of claim 1, further comprising identifying a categorical variable in said input data set.

9. The computer-implemented method of claim 8, wherein said calculating said anomaly score for said categorical variable comprises calculating an inverse frequency of a class of said given data point.

10. The computer-implemented method of claim 1, further comprising dividing said input data set into a plurality of subsets.

11. The computer-implemented method of claim 10, wherein said at least a portion of said input data set is one of said plurality of subsets.

12. The computer-implemented method of claim 10, wherein said transforming said at least a portion of said input data set includes separately transforming each of said plurality of subsets.

13. A computer-implemented system for data anomaly detection, the system comprising:

at least one processor;

memory in communication with the at least one processor, and software code stored in the memory, which when executed by the at least one processor causes the system to:

receive a signal reflective of an input data set having a plurality of dimensions, the input data set associated with an audit process of an incident ticket management system;

process the input data set to determine at least one attribute of each variable in the input data set, the at least one attribute including whether a variable is continuous or discrete;

provide the input data set and the at least one attribute of each variable to a dimensionality reduction architecture comprising a first dimensionality reducer and a second dimensionality reducer; wherein the first dimensionality reducer executes a first co-variance test, and the second dimensionality reducer executes a second co-variance test; wherein the first co-variance test and/or the second co-variance test includes determining with the at least one processor co-variance across said plurality of dimensions, wherein said assessing co-variance includes, for each pair of two variables in a plurality of pairwise combinations of variables in the input data set;

transform, with the dimensionality reduction architecture, the input data set into a dimensionality-reduced data set using the first dimensionality reducer or the second dimensionality reducer, wherein the dimensionality reduction architecture selects the first dimensionality reducer or the second dimensionality reducer based on a count of the number of continuous variables in the input data set;

wherein the transforming includes: when the selected first or second dimensionality reducer determines that the two variables associated with the respective co-variance test is statistically significant based on a pre-defined threshold, transform at least a portion of said input data set into a dimensionality-reduced data set by removing data for one of the two variables associated with the respective co-variance test;

for each given data point in said dimensionality-reduced data set, calculate an anomaly score informative of whether said given data point is an anomaly;

wherein for at least one data point in the dimensionality-reduced data set, calculating the anomaly score for the at least one data point comprises calculating a quantity of an interquartile range (IQR) based on a distance between the at least one data point and a median value, wherein an upper bound of the anomaly score is set to twice the IQR;

generate signals representing a graphical indicator for rendering within a graphical user interface to indicate the anomaly score, wherein the generated signals comprise a signal for displaying the graphical indicator in a shading determined based on a respective attribute of the at least one data point, wherein the graphical indicator represents an identifier of an application as a cause for the anomaly associated with the incident ticket management system; and transmit the signals representing the graphical indicator to a client device for display.

14. A non-transitory computer-readable medium or media having stored thereon machine interpretable instructions which, when executed by a processor, cause the processor to perform a computer implemented method of data anomaly detection, the method comprising:

receiving a signal reflective of an input data set having a plurality of dimensions, the input data set associated with an audit process of an incident ticket management system;

processing the input data set to determine at least one attribute of each variable in the input data set, the at least one attribute including whether a variable is continuous or discrete;

providing the input data set and the at least one attribute of each variable to a dimensionality reduction architecture comprising a first dimensionality reducer and a second dimensionality reducer; wherein the first dimensionality reducer is configured to execute a first co-variance test, and the second dimensionality reducer is configured to execute a second co-variance test; wherein the first co-variance test and/or the second co-variance test includes determining with the processor co-variance across said plurality of dimensions, wherein said assessing co-variance includes, for each pair of two variables in a plurality of pairwise combinations of variables in the input data set;

transforming, with the dimensionality reduction architecture, the input data set into a dimensionality-reduced data set using the first dimensionality reducer or the second dimensionality reducer, wherein the dimensionality reduction architecture selects the first dimensionality reducer or the second dimensionality reducer based on a count of the number of continuous variables in the input data set;

wherein the transforming includes: when the selected first or second dimensionality reducer determines that the two variables associated with the respective co-variance test is statistically significant based on a pre-defined threshold, transforming at least a portion of said input data set into a dimensionality-reduced data set by removing data for one of the two variables associated with the respective co-variance test;

for each given data point in said dimensionality-reduced data set, calculating an anomaly score informative of whether said given data point is an anomaly;

wherein for at least one data point in the dimensionality-reduced data set, calculating the anomaly score for the at least one data point comprises calculating a quantity of an interquartile range (IQR) based on a distance between the at least one data point and a median value, wherein an upper bound of the anomaly score is set to twice the IQR;

generating signals representing a graphical indicator for rendering within a graphical user interface to indicate the anomaly score, wherein the generated signals comprise a signal for displaying the graphical indicator in a shading determined based on a respective attribute of the at least one data point, wherein the graphical indicator represents an identifier of an application as a cause for the anomaly associated with the incident ticket management system; and transmitting the signals representing the graphical indicator to a client device for display.

15. The system of claim 13, wherein the software code, when executed by the at least one processor causes the system to: calculate an aggregate anomaly score by combining a plurality of said anomaly scores.

16. The system of claim 13, wherein said at least one attribute includes whether said variable is normally distributed.

17. The system of claim 13, wherein said at least one attribute includes whether said variable is continuous.

18. The system of claim 13, wherein said plurality of co-variance tests includes at least two of a Pearson's correlation, a Spearman's correlation, an F-Test, a T-Test, a Kruskal-Wallis, a Mann-Whitney U Test, and a $\chi^2$ Test.

* * * * *